United States Patent [19]

Blasko et al.

[11] 4,137,087

[45] Jan. 30, 1979

[54] CURABLE COMPOSITIONS COMPRISING AQUEOUS SOLUTIONS OF WATER-SOLUBLE SILICATES AND WATER-SOLUBLE LATENT INSOLUBILIZING AGENTS

[75] Inventors: John E. Blasko; William G. Boberski, both of Gibsonia; Jerome A. Seiner, Pittsburgh, all of Pa.

[73] Assignee: PPG Industries, Inc., Pittsburgh, Pa.

[21] Appl. No.: 740,983

[22] Filed: Nov. 11, 1976

[51] Int. Cl.$^2$ ............................................. C09D 1/04
[52] U.S. Cl. ................................. 106/84; 106/38.3; 106/38.35; 106/74; 106/287.1; 106/286.1; 106/286.3; 106/386.4; 106/286.5
[58] Field of Search ............... 106/74, 84, 14, 38.35, 106/38.3, 287 S

[56] References Cited

U.S. PATENT DOCUMENTS

| | | | |
|---|---|---|---|
| 3,435,899 | 4/1969 | McLaughlin et al. | 106/74 |
| 3,442,671 | 5/1969 | Rolland et al. | 108/84 |
| 3,715,224 | 2/1973 | Campbell | 106/74 |
| 3,764,356 | 10/1973 | Sams | 106/74 |
| 3,973,998 | 8/1976 | Datta et al. | 106/74 |

*Primary Examiner*—Winston A. Douglas
*Assistant Examiner*—J. V. Howard
*Attorney, Agent, or Firm*—Charles R. Wilson

[57] ABSTRACT

Curable compositions which form cured products having excellent durability, stain resistance, resistance to heat and flame, and water resistance as well as other desirable properties are prepared by forming aqueous solutions of water-soluble silicates and water-soluble latent insolubilizing agents formed from a metal ion selected from the group consisting of $Al^{+++}$, $Fe^{+++}$, $Cr^{+++}$ and $Sn^{++}$ and a ligand selected from the group consisting of ethylenediaminetetraacetate, diethylenetriaminepentaacetate, N-(hydroxyethyl)ethylenediaminetriacetate, nitrilotriacetate and 1,3-propanediaminetetraacetate.

The compositions have excellent stability and may be employed in various applications such as coatings, castings, and molding applications. The compositions are particularly useful in coating applications.

20 Claims, No Drawings

CURABLE COMPOSITIONS COMPRISING AQUEOUS SOLUTIONS OF WATER-SOLUBLE SILICATES AND WATER-SOLUBLE LATENT INSOLUBILIZING AGENTS

BACKGROUND OF THE INVENTION

During the past several years, environmental pollution concerns have led those active in the coatings, castings, and moldings industries to investigate various compositions in which organic solvents derived from petroleum have been eliminated or at least substantially reduced in quantity. Thus, compositions such as water-based compositions and high solids compositions have been extensively investigated. Even more recently the petroleum embargo and the resultant high cost and scarcity of petroleum by-products has increased interest in the investigation of compositions which are composed substantially of inorganic constituents.

The present invention relates to a curable composition composed substantially of inorganic constituents. More particularly, the present invention relates to curable compositions comprising aqueous solutions of water-soluble silicates and water-soluble latent insolubilizing agents.

A number of water-soluble silicate compounds are known in the art. Such compounds include sodium silicate, potassium silicate, lithium silicate and quaternary ammonium silicates which readily dissolve in water to form solutions therewith. Inasmuch as the pH of these solutions is normally higher than about 10.5, the silica will remain soluble therein. However, when these water-soluble silicates are blended with insolubilizing agents (i.e., crosslinkers) quite often the resultant solution is unstable. Thus, for example, the combination of water-soluble silicates with metal oxides of the form MO such as cadmium oxide, copper oxide, calcium oxide, lead oxide and the like has produced unstable systems in that these materials ordinarily cause precipitation of insoluble hydroxides or silicates of these oxides. In addition to problems of composition stability, films formed from water-soluble silicates and water-soluble insolubilizing agents have in the past proven to be extremely sensitive to water. Thus, such compositions have heretofore been deficient in wet abrasion resistance.

Accordingly, as will be apparent, a curable composition containing a water-soluble inorganic silicate and a water-soluble latent insolubilizing agent which exhibits excellent stability and produces cured products having excellent durability, stain resistance, resistance to heat and flame and water-resistance as well as other desirable properties is of considerable advantage.

SUMMARY OF THE INVENTION

The present invention relates to curable compositions having the above-mentioned advantages. The curable compositions are prepared by forming aqueous solutions of water-soluble silicates and water-soluble latent insolubilizing agents formed from a metal ion selected from the group consisting of $Al^{+++}$, $Fe^{+++}$, $Cr^{+++}$ and $Sn^{++}$ and a ligand selected from the group consisting of ethylenediaminetetraacetate, diethylenetriaminepentaacetate, N-(hydroxyethyl)-ethylenediaminetriacetate, nitrilotriacetate and 1,3-propanediaminetetraacetate.

The compositions of the invention have a number of advantageous properties. Thus, the curable compositions herein have excellent stability. Further, the curable compositions can be cured by removal of water from the compositions which can be accomplished either by drying the compositions in air at ambient temperature or by the use of moderate baking temperatures. Finally, these curable compositions form cured products having excellent durability, stain resistance, resistance to heat and flame and water resistance.

DESCRIPTION OF THE INVENTION

This invention is concerned with the discovery of curable compositions which are composed substantially of inorganic constituents. The curable compositions of the invention comprise aqueous solutions of water-soluble silicates and water-soluble latent insolubilizing agents.

Water-soluble silicates which may be employed in the compositions herein include sodium silicate, potassium silicate, lithium silicate, quaternary ammonium silicates and the like. A preferred water-soluble silicate is potassium silicate.

Water-soluble latent insolubilizing agents which are employed in the compositions herein are those formed from metal ions selected from the group consisting of $Al^{+++}$, $Fe^{+++}$, $Cr^{+++}$ and $Sn^{++}$ and ligands (i.e., complexing agents) selected from the group consisting of ethylenediaminetetraacetate, diethylenetriaminepentaacetate, N-(hydroxyethyl)ethylenediaminetetraacetate, nitrilotriacetate and 1,3-propanediaminetetraacetate. It should be noted that other similar or analogous type ligands where they exist may be employed and these are considered to be within the scope of the invention.

Illustrative examples of such latent insolubilizing agents are compounds such as sodium ethylenediaminetetraacetato aluminate (III), sodium ethylenediaminetetraacetato ferrate (III), sodium ethylenediaminetetraacetato chromate (III), sodium ethylenediaminetetraacetato stannate (II) and the like.

While not wishing to be bound by any particular theory, it should be noted at this time that while the above compounds exist prior to their addition to the alkaline environment (e.g., pH of 10.5–12.5) of the aqueous solution containing the water soluble alkali silicate, it is possible that these compounds may not be present in the alkaline environment in the exact compositional form indicated. Thus, it is possible that in the alkaline environment of the aqueous solution of alkali silicate, these compounds may be present in the form of various complexes of metal ions (e.g., $Al^{+++}$, $Fe^{+++}$, etc.) and ethylenediaminetetraacetate ions (hereinafter EDTA).

The amounts of these latent insolubilizing agents which may be included in the compositions herein can vary considerably depending upon desired properties. However, in general, the amount of latent insolubilizing agent which is employed is an amount sufficient to enhance the wet abrasion and water resistance of the cured composition but which is insufficient to cause package instability in the uncured composition. In most instances, amounts of latent insolubilizing agents ranging from about 0.2 percent to about 10.0 percent, preferably 1.0 percent to 5.0 percent by weight based upon the combined weight of the water-soluble silicate and water-soluble latent insolubilizer may be employed.

The reaction between the water-soluble silicate (i.e., alkali silicate) and latent insolubilizing agent is not known with certitude, however, it is theorized that the ligand forms a coordination complex with the metal ion which is stable at pH of greater than 7.0 and maintains a stable composition. However, upon drying (e.g., air drying or baking) the equilibrium shifts towards complex dissociation and the metal ion or a derivative thereof then crosslinks the silicate to form an insoluble silicate composition having excellent properties such as durability, stain resistance, flame and heat resistance and water resistance.

In addition to the water-soluble silicate and latent insolubilizing agent, the curable compositions of the invention may contain certain other additives normally employed in compositions such as, for example, pigments, dyes, fillers, antioxidants, flow control agents, surfactants and the like.

However, it has been found that certain specific additives produce advantageous effects on the properties of the curable compositions herein. For example, titanium dioxide has been found to accelerate the reaction between the complexing agent and the alkali silicate. The reason for this is not known with certainty but is believed to be due to absorption of free ligand on the surface of the pigment.

Another unusual aspect in the compositions in the invention is the discovery that the addition of phosphate type surfactants to these compositions improves adhesion without impairing water resistance. Thus, for example, phosphate type surfactants or wetting agents such as potassium tripolyphosphate, sodium tripolyphosphate and organo phosphates such as PK-90, available from Dexter Chemical Company, and the like may be employed.

In addition, it is often advantageous to include in the composition a water-soluble thickener. Of particular value are water-soluble thickeners which are solubilized through carboxyl groups. Illustrative of such materials are sodium polyacrylate, potassium polyacrylate, sodium salts of styrene maleic anhydride copolymers, sodium carboxymethyl cellulose, potassium polyacrylate copolymers and the like.

It should be noted here that in a few instances, depending upon the specific silicate and complex employed in the composition, the use of such thickeners may result in some lowering of the overall water resistance of the cured composition. In such cases, it may be desirable to either reduce the amount of thickener employed or to dispense with its use entirely.

As mentioned above, the curable compositions of the invention can be employed in various applications such as for coatings, castings or moldings. The compositions are particularly useful in coatings over a variety of substrates such as wood, metals, glass and the like.

The curable compositions herein can be applied by any conventional method including brushing, rolling, dipping, flow coating, roll coating, spraying and the like. Conventional spray techniques and equipment can be utilized.

The curable compositions of the invention may be cured by baking at moderate or elevated temperatures if desired. However, one especially advantageous property of these curable compositions is that they can be cured by drying them in air at ambient temperature without the use of heat. As will be evident, ambient temperature curable compositions are of considerable advantage in that they provide for significant energy savings in comparison to compositions which require elevated temperatures for curing.

The following examples are submitted for the purpose of further illustrating the nature of the present invention and should not be construed as a limitation on the scope thereof. All parts and percentages in the examples and throughout the specification are by weight unless otherwise indicated.

The following examples (A-L) illustrate the preparation of latent insolubilizing agents.

EXAMPLE A

Into a container equipped with a magnetic stirrer was charged 4.5 parts of sodium ethylenediaminetetraacetate (a compound designated as $Na_4EDTA.2H_2O$, available in the form of a solid powder from the Fisher Company) and 150.0 parts of tap water. The charged ingredients were mixed until a clear solution was obtained. Then 3.3 parts of $Al_2(SO_4)_3.18H_2O$ (available in the form of a solid powder from the Fisher Company) were added to the container and mixing continued for about 2.5 hours. The resultant $Al^{+++}$/EDTA solution after this extended mixing period was very turbid.

EXAMPLE B

Into a container equipped with a magnetic stirrer was charged 1.4 parts $SnCl_2$ and 18.5 parts of water. Then 3.1 parts of $Na_4EDTA.2H_2O$ were added and the mixture stirred for 15 minutes. At this time, the solids did not dissolve. Following this, 18.5 parts of water and 4.2 parts of $Na_4EDTA.2H_2O$ were added to the container with stirring. The resultant solution was nearly clear, exhibiting a light green color.

EXAMPLE C

This example illustrates the effect of using high levels of $Sn^{++}$/EDTA complex. Into a container equipped with a magnetic stirrer was charged 4.2 grams of $Na_4EDTA.2H_2O$, 20 grams of water, 1.9 grams of $SnCl_2$ and 60 grams of an aqueous potassium silicate solution having an $SiO_2:K_2O$ ratio of 3.1:1 and a solids content of 38.8 percent by weight, available commercially from the Philadelphia Quartz Company under the designation Kasil No. 6. The ingredients were stirred and a precipitate formed which did not completely dissolve. The product was then evaluated in the composition of Example 4.

EXAMPLES D-F

In these examples, a series of $Al^{+++}$/EDTA complex solutions were prepared utilizing varying amounts of $Al^{+++}$ and EDTA.

The solutions were prepared by mixing the following ingredients in a container equipped with magnetic stirrer:

| Ingredients | Ex. No. | Parts by Weight | | |
|---|---|---|---|---|
| | | D | E | F |
| $Al_2(SO_4)_3 \cdot 18H_2O$ | | 3.90 | 5.90 | 7.80 |
| $Na_4EDTA \cdot 2H_2O$ (as in Example A) | | 5.46 | 8.20 | 10.92 |
| $H_2O$ | | 30.00 | 30.00 | 30.00 |

After mixing, the solution of Example D was nearly clear while those of Examples E and F were cloudy. The above solutions were formulated into coating compositions, cured and the coatings then evaluated for wet abrasion and water resistance as shown in Examples 5-7.

EXAMPLES G-I

In these examples, a series of $Sn^{++}$/EDTA complex solutions were prepared utilizing various levels of $Sn^{++}$ and EDTA.

The solutions were prepared by mixing the following ingredients in a container equipped with a magnetic stirrer:

| Ingredients | Ex. No. | Parts by Weight | | |
|---|---|---|---|---|
| | | G | H | I |
| $SnCl_2$ | | 2.50 | 3.75 | 5.00 |
| $Na_4EDTA \cdot 2H_2O$ (as in Example A) | | 5.46 | 8.20 | 10.92 |
| $H_2O$ | | 40.00 | 40.00 | 40.00 |
| HCl (12 N aqueous solution) | | 2.00 | 2.00 | 2.00 |

After mixing, the solutions of Examples G and H were nearly clear while that of Example I was cloudy.

The above solutions were formulated into coating compositions, cured and the coatings then evaluated for wet abrasion and water resistance as shown in Examples 8-10.

EXAMPLES J-L

These examples illustrate the preparation of $Fe^{++\lambda+}$/EDTA, $Cr^{+++}$/EDTA and $Al^{+++}$/EDTA complexes.

The complex solutions were prepared by mixing the following ingredients in a container equipped with a magnetic stirrer:

| Ingredients | Ex. No. | Parts by Weight | | |
|---|---|---|---|---|
| | | J | K | L |
| $Al_2(SO_4)_3 \cdot 18H_2O$ | | 3.30 | — | — |
| $FeCl_3$ | | — | 2.70 | — |
| $CrCl_3$ | | — | — | 2.70 |
| $Na_4EDTA \cdot 2H_2O$ (as in Example A) | | 6.00 | 6.00 | 6.00 |
| $H_2O$ | | 164.00 | 164.00 | 164.00 |

After mixing, the solution of Example J was clear and colorless, the solution of Example K was clear and brown in color and the solution of Example L was cloudy and purple in color.

The above solutions were formulated into coating compositions, cured and the coatings then evaluated for wet abrasion and water-resistance as shown in Examples 11-13.

The following examples (1-13) illustrate curable pigmented compositions prepared from the complexes of the foregoing examples (i.e., A-L) and water-soluble silicates.

EXAMPLE 1

Into a container equipped with a 2" Cowles blade mixer was charged 231.5 parts of an aqueous potassium silicate solution having an $SiO_2:K_2O$ ratio of 3.3:1 and a solids content of 38.8 percent by weight, available commercially from the Philadelphia Quartz Company under the designation Kasil No. 6. Then, 157.8 parts of the complex solution of Example A were added to the container with mixing. Following this addition, 10.4 parts of water and 18.3 parts of a surfactant mixture consisting of 7.5 parts of water, 1.2 parts of Foamaster VL (a defoamer available from Nopco Chemical Company), 4.0 parts of Antarox BL 240 (a non-ionic surfactant available from GAF Corporation), 3.6 parts of PK-90 solution (a solution consisting of 0.6 part of PK-90, an organic phosphate available from Dexter Chemical Corporation, and 3.0 parts water) and 2.0 parts of a 50 percent aqueous solution of potassium tripolyphosphate (Stauffer Chemical Company) were added. Then, 72.5 parts of mica, 94.7 parts of titanium dioxide, 12.2 parts of red iron oxide, and 10.0 parts of Attagel 40 (magnesium aluminum silicate thixotropic agent available from Engelhard Minerals) were individually added to the container with stirring. Finally, 10.0 parts of water and 1.0 part of Foamaster VL were added to the container.

The curable composition resulting from the above process was drawn down on duplicate sets of glass panels using a 3-mil Bird Bar. One set of coated glass panels was cured by air drying for 1⅜ days at room temperature and heating in a 120° F. oven for 11⅜ days. A second set of coated glass panels was cured by air drying at ambient temperature for 13 days.

The cured coatings were than evaluated for web abrasion resistance by soaking the coated glass panels in water for one hour and then rubbing the surface of the film with a water soaked cloth. The web abrasion resistance was evaluated, determining the number of double finger rubs. In this test, both sets of coated panels passed over 200 double finger rubs without abrading the surface, thereby indicating that the composition forms films having excellent wet abrasion and water resistance. A similar composition containing no metal complex failed this test at one and 16 double finger rubs in two trials.

EXAMPLE 2

Into a container equipped with a 2" Cowles Blade mixer was charged 231.5 parts of an aqueous potassium silicate solution having an $SiO_2:K_2O$ ratio of 3.3:1 and a solids content of 38.8 percent by weight available commercially from the Philadelphia Quartz Company under the designation Kasil No. 6. Then, 157.8 parts of the complex solution of Example A were added to the container with mixing. Following this addition, 10.4 parts of water and 18.3 parts of a surfactant mixture consisting of 7.5 parts of water, 1.2 parts of Foamaster VL (a defoamer available from Nopco Chemical Company), 4.0 parts of Antarox BL 240 (a non-ionic surfactant available from GAF Corporation), 3.6 parts of PK-90 solution (a solution consisting of 0.6 part of PK-90, an organic phosphate available from Dexter Chemical Corporation and 3.0 parts of water), and 2.0 parts of a 50 percent aqueous solution of potassium tripolyphosphate were added. Then, 72.5 parts of mica, 12.5 parts of sodium carboxymethyl cellulose, 94.7 parts of titanium dioxide, 12.2 parts of red iron oxide, and 10.0 parts of Attagel 40 (a magnesium aluminum silicate thixotroping agent available from Engelhard Minerals) were individually added to the container with stirring. Finally, 10.0 parts of water and 1.0 part of Foamaster VL were added to the container.

The curable composition resulting from the above process was drawn down in films on duplicate sets of glass panels, cured, soaked and evaluated for wet abrasion and water resistance in essentially the same manner as in Example 1. In this test, the set of control panels cured by air drying for 1⅜ days and heating in the oven for 11⅜ days at 120° F. passed 130 double finger rubs while the set of coated panels cured by air drying for 13 days at ambient temperature passed 150 double finger rubs, again indicating excellent wet abrasion and water resistance.

EXAMPLE 3

Into a container equipped as in Examples 1 and 2 was charged 114.0 parts of the potassium silicate solution of Example 1 (i.e., Kasil No. 6). Then, the complex solution of Example B (45.7 parts) was added with stirring. At this point a precipitate formed, which upon additional stirring dissolved. Then 90.7 parts of a pigment paste prepared in conventional manner and consisting of 48.7 percent of $H_2O$, 0.5 percent of aminomethyl propanol, 0.5 percent of Foamaster G (a defoamer available from Nopco Chemical Company), 37.2 percent of $TiO_2$, 10.4 percent of mica and 2.7 percent of Attagel 40 was added. The resultant composition was drawn down in a 3 mil thickness as in Examples 1 and 2 and cured by drying in air at ambient temperature for 24 hours. Wet abrasion and water resistance of the cured film was evaluated by immersing one half ($\frac{1}{2}$) of the coated panel in water for one hour and then rubbing both the soaked and unsoaked areas of the coated panel with a wet cloth. In this test, both the soaked and unsoaked areas of the coated panel passed 200 double finger rubs without abrasion of the film, indicating that the composition forms cured films having excellent wet abrasion and water resistance.

EXAMPLE 4

This example illustrates the effect on coating composition properties of using the $Sn^{++}$/EDTA complex of Example C.

Into a container equipped as in Example 1 were charged 114.0 parts of the aqueous potassium silicate solution designated Kasil No. 6 and 86.1 parts of the complex solution of Example C. Upon mixing these ingredients, a gel formed. The addition of 24.0 parts of water to the gel caused it to thin out but the resultant composition remained cloudy even after stirring for an additional hour. Then, 71.8 parts of a pigment paste, prepared in conventional manner, containing 34.3 percent of water, 0.7 percent of aminomethyl propanol, 0.7 percent of Foamaster G, 47.5 percent titanium dioxide, 13.4 percent of mica and 3.4 percent of Attagel 40 was added to the containers with stirring.

The resultant composition was drawn down on a glass panel using a 3-mil Bird Bar and cured by air drying at ambient temperature for 24 hours. The coated glass panel was then partially immersed in water and allowed to soak for one hour. Both the soaked area and the unsoaked areas of the coated panel were then evaluated for wet abrasion and water resistance by rubbing the cured coating with a wet cloth. The unsoaked area of the film did not abrade after 200 double finger rubs while the soaked area abraded after 30 double finger rubs. This example shows that the use of excess quantities of insolubilizing agent in the composition not only affects the package stability of the uncured composition but also adversely affects the web abrasion and water resistance of the cured composition.

EXAMPLES 5-7

These examples illustrate curable coating compositions formulated from potassium silicate and the complex solutions of Examples D-F. In these examples, the compositions were prepared by mixing the following ingredients in a container equipped with a 2" Cowles blade mixer:

| Ingredients | Ex. No. | Parts by Weight 5 | 6 | 7 |
|---|---|---|---|---|
| Aqueous potassium silicate of Example 1 (Kasil No. 6) | | 231.30 | 231.30 | 231.30 |
| Complex solution of Example D[1] | | 39.36 | — | — |
| Complex solution of Example E[2] | | — | 44.10 | — |
| Complex solution of Example F[3] | | — | — | 48.70 |
| Aminomethyl propanol | | 1.00 | 1.00 | 1.00 |
| Foamaster G | | 2.00 | 2.00 | 2.00 |
| $TiO_2$ | | 112.00 | 112.00 | 112.00 |
| Mica | | 35.00 | 35.00 | 35.00 |
| Attagel 40 | | 22.50 | 22.50 | 22.50 |
| Sodium carboxymethyl cellulose | | 7.50 | 7.50 | 7.50 |
| $H_2O$ | | 158.50 | 158.50 | 158.50 |

[1] Upon addition, the composition became very slightly cloudy.
[2] Upon addition, the composition became cloudy and stiff.
[3] Upon addition, the composition became cloudy and stiff.

The curable coating compositions resulting from mixing the above ingredients were drawn down on duplicate glass panels using a 3-mil Bird Bar, cured by drying in air at ambient temperature for various time periods and then evaluated for wet abrasion and water resistance using the procedure of Example 1. Test conditions and test results are shown in Table I.

TABLE I

| Example No. | Cure Conditions | Water Soak | Cure Time (# Double Finger Rubs) 1 Day | 3 Days | 4 Days | 7 Days |
|---|---|---|---|---|---|---|
| 5 | Ambient temperature - air dry | 1 hr. | 20 | 71 | 90 | 116 |
| 6 | Ambient temperature - air dry | 1 hr. | 5 | 10 | 10 | 3 |
| 7 | Ambient temperature - air dry | 1 hr. | 2 | 6 | 3 | 5 |

The above examples again illustrate that high levels of insolubilizing agent in the compositions cause instability in the uncured composition and adversely affect the wet abrasion and water resistance of the cured compositions.

EXAMPLES 8-10

These examples illustrate curable coating compositions formulated from potassium silicate and the complex solutions of Examples G-I.

In these examples, the compositions were prepared by mixing the following ingredients in a container equipped with a 2" Cowles blade mixer:

|  |  | Parts by Weight | | |
|---|---|---|---|---|
| Ingredients | Ex. No. | 8 | 9 | 10 |
| Aqueous potassium silicate of solution Example 1 (Kasil No. 6) |  | 231.30 | 231.30 | 231.30 |
| Complex solution of Example G[(1)] |  | 49.96 | — | — |
| Complex solution of Example H[(2)] |  | — | 53.95 | — |
| Complex solution of Example I[(3)] |  | — | — | 57.92 |
| Aminomethyl propanol |  | 1.00 | 1.00 | 1.00 |
| Foamaster G |  | 2.00 | 2.00 | 2.00 |
| $TiO_2$ |  | 112.00 | 112.00 | 112.00 |
| Mica |  | 35.00 | 35.00 | 35.00 |
| Attagel 40 |  | 22.50 | 22.50 | 22.50 |
| Sodium carboxymethyl cellulose |  | 7.50 | 7.50 | 7.50 |
| $H_2O$ |  | 158.50 | 158.50 | 158.50 |

[(1)]Upon adding to potassium silicate, composition remained clear.
[(2)]Upon adding to potassium silicate, composition remained nearly clear but some lumps formed which broke up when thinned with $H_2O$.
[(3)]Same observation as in (2) above.

The curable compositions resulting from mixing the above ingredients were drawn down on duplicate glass panels using a 3-mil Bird Bar, cured by drying in air at ambient temperature for various time periods and then the cured coatings were evaluated for wet abrasion and water resistance using the procedure of Examples 5–7. Test conditions and results are shown in Table II.

TABLE II

| Ex. No. | Cure Conditions | Water Soak | Cure Time (# Double Finger Rubs) | | |
|---|---|---|---|---|---|
|  |  |  | 1 Day | 3 Days | 4 Days |
| 8 | Ambient temperature-air dry | 1 hr. | 11 | 200+ | 200+ |
| 9 | Ambient temperature-air dry | 1 hr. | 5 | 7 | 7 |
| 10 | Ambient temperature-air dry | 1 hr. | 4 | 7 | 7 |

The above examples further illustrate the adverse effect of high levels of insolubilizing agent on the wet abrasion and water resistance of the cured composition.

EXAMPLES 11–13

These examples illustrate curable coating compositions formulated from potassium silicate and the $Al^{+++}$/EDTA, $Fe^{+++}$/EDTA and $Cr^{+++}$/EDTA complexes of Examples J–L.

In these examples, the compositions were prepared by mixing the following ingredients in a container equipped with a 2" Cowles blade mixer:

|  |  | Parts by Weight | | |
|---|---|---|---|---|
| Ingredients | Ex. No. | 11 | 12 | 13 |
| Aqueous potassium silicate solution of Example 1 |  | 231.0 | 231.0 | 231.0 |
| Complex solution of Example J |  | 173.3 | — | — |
| Complex solution of Example K |  | — | 172.7 | — |
| Complex solution of Example L |  | — | — | 172.7 |
| Surfactant mixture of Example 1 |  | 14.1 | 14.1 | 14.1 |
| Foamaster VL |  | 2.2 | 2.2 | 2.2 |
| Mica |  | 72.5 | 72.5 | 72.5 |
| Sodium carboxymethyl cellulose |  | 12.5 | 12.5 | 12.5 |
| $TiO_2$ |  | 94.7 | 94.7 | 94.7 |
| Red Iron Oxide ($Fe_2O_3$) |  | 12.2 | 12.2 | 12.2 |
| Attagel 40 |  | 10.0 | 10.0 | 10.0 |

The curable compositions resulting from mixing the above ingredients were drawn down on glass panels using a 3-mil Bird Bar, cured by drying in air at ambient temperature for ten (10) days and then the cured coatings were evaluated for wet abrasion and water resistance as in Example 1. The cured composition of Example 11 passed up to 60 double finger rubs, the cured composition of Example 12 passed up to 14 double finger rubs and the cured composition of Example 13 passed over 200 double finger rubs.

The following examples (i.e., 14–15) illustrate unpigmented (i.e., clear) compositions.

EXAMPLES 14–15

In these examples, an unpigmented control composition (Example 14) composed of only an aqueous potassium silicate solution was compared to a curable unpigmented composition (Example 15) composed of an aqueous potassium silicate solution and an $Al^{+++}$/EDTA complex.

The compositions were prepared by mixing the following ingredients:

|  |  | Parts by Weight | |
|---|---|---|---|
| Ingredients | Ex.No. | 14 (Control) | 15 |
| Kasil No. 1* |  | 308.0 | 308.0 |
| $H_2O$ |  | 40.0 | 40.0 |
| $Al_2(SO_4)_3 \cdot 18H_2O$ |  | — | 3.3 |
| $Na_4EDTA \cdot 2H_2O$ (as in Example 1) |  | — | 6.0 |

*An aqueous potassium silicate solution having an $SiO_2:K_2O$ ratio of 3.93:1 and a solids content of 29.1 percent by weight, available commercially from the Philadelphia Quartz Company.

The compositions resulting from mixing the above ingredients were drawn down on glass panels using a 3-mil Bird Bar and cured by drying an air at ambient temperature for 24 hours. The coated panels containing the cured coatings were then soaked in water for ten (10) minutes and evaluated for wet abrasion and water resistance as in Examples 1–13.

The coating formed from the control composition (i.e., Example 14 - no complex) failed (i.e., was removed) after only two double finger rubs while the cured coating formed from the test composition (i.e., Example 15 - $Al^{+++}$/EDTA complex) passed over 100 rubs without failure.

Compositions of similar stability are formed with $Al^{+++}$, $Fe^{+++}$, $Cr^{+++}$ and $Sn^{++}$ with ligands of the type: diethylenetriaminepentaacetate, N-(hydroxyethyl)ethylenediaminetriacetate, nitrilotriacetate, 1,3-propanediaminetetraacetate.

According to the provisions of the Patent Statutes, there have been described above the invention and what are now believed to be its best embodiments. However, within the scope of the appended claims, it is to be understood that the invention can be practiced otherwise than as specifically described.

We claim:

1. Curable coating compositions comprising aqueous solutions of water-soluble silicates and a water-soluble latent insolubilizing agent formed from $Al^{+++}$ ions and ligands selected from the group consisting of ethylenediaminetetraacetate, diethylenetriaminepentaacetate, N-(hydroxyethyl)-ethylenediaminetriacetate, nitrilotriacetate and 1,3-propanediaminetetraacetate; wherein said insolubilizing agent is stable at a pH of greater than 7.0, and wherein the amounts of said insolubilizing agent included in said compositions are sufficient to enhance the wet abrasion and water resistance of the cured compositions, as measured by soaking a cured coating on a glass panel in water and rubbing the surface of the coating with a water soaked cloth at least 130 double finger rubs without abrading the surface, but insufficient to cause package instability in the uncured compositions.

2. The curable composition of claim 1 further containing a water-soluble thickener.

3. The curable composition of claim 1 further containing a pigment or pigments.

4. The curable composition of claim 1 further containing phosphate type surfactants.

5. The curable composition of claim 1 wherein the amount of water-soluble latent insolubilizer employed in said composition is from about 0.2 to about 10.0 percent based upon the combined weight of water-soluble silicate and water-soluble latent insolubilizer.

6. Curable coating compositions comprising aqueous solutions of water-soluble silicates and a water-soluble latent insolubilizing agent formed from $Fe^{+++}$ ions and ligands selected from the group consisting of ethylenediaminetetraacetate, diethylenetriaminepentaacetate, N-(hydroxyethyl)-ethylenediaminetriacetate, nitrilotriacetate and 1,3-propanediaminetetraacetate; wherein said insolubilizing agent is stable at a pH of greater than 7.0, and wherein the amounts of said insolubilizing agent included in said compositions are sufficient to enhance the wet abrasion and water resistance of the cured compositions, as measured by soaking a cured coating on a glass panel in water and rubbing the surface of the coating with a water soaked cloth at least 130 double finger rubs without abrading the surface, but insufficient to cause package instability in the uncured compositions.

7. The curable composition of claim 6 further containing a water-soluble thickener.

8. The curable composition of claim 6 further containing a pigment or pigments.

9. The curable composition of claim 6 further containing phosphate type surfactants.

10. The curable composition of claim 6 wherein the amount of water-soluble latent insolubilizer employed in said composition is from about 0.2 to about 10.0 percent based upon the combined weight of water-soluble silicate and water-soluble latent insolubilizer.

11. Curable coating compositions comprising aqueous solutions of water-soluble silicates and a water-soluble latent insolubilizing agent formed from $Cr^{+++}$ ions and ligands selected from the group consisting of ethylenediaminetetraacetate, diethylenetriaminepentaacetate, N-(hydroxyethyl)-ethylenediaminetriacetate, nitrilotriacetate and 1,3-propanediaminetetraacetate; wherein said insolubilizing agent is stable at a pH of greater than 7.0, and wherein the amounts of said insolubilizing agent included in said compositions are sufficient to enhance the wet abrasion and water resistance of the cured compositions, as measured by soaking a cured coating on a glass panel in water and rubbing the surface of the coating with a water soaked cloth at least 130 double finger rubs without abrading the surface, but insufficient to cause package instability in the uncured compositions.

12. The curable composition of claim 11 further containing a water-soluble thickener.

13. The curable composition of claim 11 further containing a pigment or pigments.

14. The curable composition of claim 11 further containing phosphate type surfactants.

15. The curable composition of claim 11 wherein the amount of water-soluble latent insolubilizer employed in said composition is from about 0.2 to about 10.0 percent based upon the combined weight of water-soluble silicate and water-soluble latent insolubilizer.

16. Curable coating compositions comprising aqueous solutions of water-soluble silicates and a water-soluble latent insolubilizing agent formed from $Sn^{++}$ ions and ligands selected from the group consisting of ethylenediaminetetraacetate, diethylenetriaminepentaacetate, N-(hydroxyethyl)-ethylenediaminetriacetate, nitrilotriacetate and 1,3-propanediaminetetraacetate; wherein said insolubilizing agent is stable at a pH of greater than 7.0, and wherein the amounts of said insolubilizing agent included in said compositions are sufficient to enhance the wet abrasion and water resistance of the cured compositions, as measured by soaking a cured coating on a glass panel in water and rubbing the surface of the coating with a water soaked cloth at least 130 double finger rubs without abrading the surface, but insufficient to cause package instability in the uncured compositions.

17. The curable composition of claim 16 further containing a water-soluble thickener.

18. The curable composition of claim 16 further containing a pigment or pigments.

19. The curable composition of claim 16 further containing phosphate type surfactants.

20. The curable composition of claim 16 wherein the amount of water-soluble latent insolubilizer employed in said composition is from about 0.2 to about 10.0 percent based upon the combined weight of water-soluble silicate and water-soluble latent insolubilizer.

* * * * *